United States Patent [19]

Aulich et al.

[11] 4,193,782

[45] Mar. 18, 1980

[54] DEVICE FOR DRAWING A GROUP OF CLADDED LIGHT CONDUCTING FIBERS

[75] Inventors: Hubert Aulich, Munich; Josef Grabmaier, Berg; Karl-Heinz Eisenrith, Schliersee, all of Fed. Rep. of Germany

[73] Assignee: Siemens Aktiengesellschaft, Berlin & Munich, Fed. Rep. of Germany

[21] Appl. No.: 924,176

[22] Filed: Jul. 13, 1978

[30] Foreign Application Priority Data

Jul. 28, 1977 [DE] Fed. Rep. of Germany ....... 2734152

[51] Int. Cl.² .............................................. C03B 37/02
[52] U.S. Cl. ................................ 65/11 R; 65/3 H; 65/3 C; 65/11 W; 65/121
[58] Field of Search ................ 65/1, 3 A, 3 C, 11 W, 65/121, 145, DIG. 7, 3 R, 3 B

[56] References Cited

U.S. PATENT DOCUMENTS

| | | | |
|---|---|---|---|
| 3,097,941 | 7/1963 | Toulmin | 65/3 B |
| 3,209,641 | 10/1965 | Upton | 65/3 A X |
| 3,265,477 | 8/1966 | McCoppin | 65/1 |
| 4,032,313 | 6/1977 | Tokuhara | 65/1 |
| 4,040,807 | 8/1977 | Midwinter et al. | 65/121 X |
| 4,118,212 | 10/1978 | Aulich et al. | 65/3 A |

FOREIGN PATENT DOCUMENTS

| | | | |
|---|---|---|---|
| 2630978 | 1/1978 | Fed. Rep. of Germany | 65/3 A |
| 48-30126 | 9/1973 | Japan | 65/3 A |
| 4528014 | 12/1974 | Japan | 65/121 |
| 392011 | 1/1974 | U.S.S.R. | 65/3 A |

Primary Examiner—Robert L. Lindsay, Jr.
Attorney, Agent, or Firm—Hill, Van Santen, Steadman, Chiara & Simpson

[57] ABSTRACT

A device for drawing a plurality of cladded light conducting fibers utilizing a double crucible having an inner crucible and an outer crucible with each of the crucibles having a bottom and receiving a melt of the respective material, and having nozzle pairs with the nozzle of the inner crucible being aligned axially with the nozzle of the outer crucible, the device including a device for gathering the pulled fibers to form a bundle and for coating the pulled cladded fibers characterized by the nozzles being exclusively arranged at points on the bottoms of their respective crucibles where the same temperature prevails for the glass melt present in the double crucibles. To accomplish this, the nozzles are located between and equal distance from the parallel boundary lines of the bottom of the inner crucible so that the melt drawn through the nozzle travels the same distance in all directions. The device for gathering is a coating cuvette, which is preferably formed of two longitudinal halves which can be moved transversely to the direction of movement of the fibers to facilitate threading the fibers into the cuvette.

9 Claims, 6 Drawing Figures

DEVICE FOR DRAWING A GROUP OF CLADDED LIGHT CONDUCTING FIBERS

BACKGROUND OF THE INVENTION

1. Field of the Invention

The present invention is directed to a device for drawing a group of cladded light conducting fibers where the cores consist of a first glass material and the casings or cladding of a second glass material. The device comprises a double crucible having an inner and an outer crucible with the inner crucible serving to receive a melt for the material forming the core and the outer crucible for receiving a melt from the material forming the cladding. The bottom of the inner crucible as well as the bottom of the outer crucible are provided with nozzles which are arranged in nozzle pairs with each nozzle of the inner crucible being on the axis of the respective nozzle on the outer crucible and the device includes a device for gathering the pulled fibers into a bundle and for coating the gathered fibers prior to their being received on a winding drum.

2. Prior Art

In German Printed Offenlegungsschrift No. 26 30 978, a double crucible having a plurality of nozzle pairs is disclosed. In this device, the interval or spacing between the bottoms of the inner and the outer crucibles is several millimeters and the central axes of each of the nozzle pairs have to be exactly aligned. The ratio of the diameter of the nozzle of the inner crucible and the diameter of the nozzle of the outer crucible depends on the ratio of the fiber core diameter to the overall diameter of the light conducting fiber. When drawing light conducting fibers, the absolute value of the cross section of the fiber will change but the ratio of the partial cross section such as the ratio of the light conducting fiber core to the total cross section of the fiber will remain the same.

The double crucible is situated in a protective chamber having walls made of quartz glass. This protective chamber can be evacuated or charged with a protective gas. It is the purpose of the protective chamber to protect the melt in each of the crucibles from impurities.

The crucibles themselves consist of a heat resisting material, which together with the melt in the crucible does not incur any undesirable reactions. Platinum- or platinum-rhodium alloys are suitable materials for the crucibles.

For heating the double crucibles, induction heating is used which heats the outer crucible. The inner crucible and the melt in the inner crucible are heated by means of heat conduction and/or convection. A system of closing pins or mandrels serve for sealing the nozzle pairs and for the commencement of the drawing operation. Thus, prior to commencement of the drawing operation for the fibers, each of the nozzle pairs is closed by a pin which extends into each of the aligned nozzles of the pair and then during the commencement of the drawing operation, the pins are moved downward from the bottom of the double crucible to begin the drawing of the fiber having the core and cladding.

As soon as the system of pins has passed a feed roller system, the glass fibers attached to the pins are separated from the pins by means of a cutting blade. Further advancement of the fibers is carried out now by the roller system.

The freshly drawn light conducting fibers are then brought together into a group or bunch by a centering cone which is subsequently positioned in their path. The output side of the centering cone is connected to a cross head which is supplied with a liquid synthetic material from an extruder so that the fiber group or bundle is surrounded with a protective tubing or sheath. Following the outlet of the cone and cross head, a cooling bath is arranged through which the fiber bundle or group surrounded with the protective tubing or sheath is drawn and then wound on a winding or take up drum.

SUMMARY OF THE INVENTION

The present invention is directed to an improved device for drawing a group of cladded light conducting fibers. To accomplish these tasks, the present invention is directed to an improvement in a device having a double crucible having an inner crucible with a bottom and an outer crucible with a bottom, the inner crucible receiving a melt of a first glass material for the core and the outer crucible receiving a melt of a second glass material for the cladding, the bottom of the inner crucible as well as the bottom of the outer crucible being provided with a multitude of nozzles with the central axis of each nozzle in the inner crucible being aligned with a central axis of a corresponding nozzle of the outer crucible to form a nozzle pair, said device including means for gathering the plurality of cladded fibers and coating the gathered fibers to form a bundle with coated, cladded fibers. The improvement comprises the nozzles being exclusively arranged at points on the bottoms of said crucibles where the same temperature prevails for the glass melt present in the double crucible. In this context, a particularly advantageous embodiment is a design in which the inner crucible has a form so that each of the nozzles is situated inbetween and equal distance from two parallel extending boundary lines of the bottom surface of the inner crucible. The boundary lines exist at least with regard to the area of each nozzle. Thus, for each nozzle from two opposite directions, it is achieved that the same or at least similar drawing conditions in areas prevail for the glass melt forming the core of the fiber.

Thus, an advantageous embodiment is furthermore designed in such a way that the outer crucible is made of electrically conducting material and that together with the induction coil which surrounds the outer crucible, the outer crucible and coil from an induction furnace. The inner crucible is arranged inside the outer crucible in such a way that the boundary lines of the bottom of the inner crucible extend parallel to the boundary line of the bottom surface of the outer crucible. In the desired embodiment, the double crucible is preferably designed in such a way that the outer and inner crucible in a plane extending transverse to the direction of drawing the fibers have a circular section which are concentrically arranged. The inner crucible is designed to have an inner and outer concentric wall forming an annular chamber which opens towards the top so that suitable materials for the first glass melt can be lowered into the crucible for melting.

An essential advantage of the device having one of the above double crucibles resides in the fact that fresh fiber is drawn directly from such a crucible show an increased resistance to tearing. Thus, light conducting cables of any desired length can be produced without trouble.

An advantageous further development of the device is the design of the means for grouping or gathering the fiber and coating the gathered fibers. The means comprises a coating cuvette which can be charged with a coating material and is provided with an opening at each end. The interior of the cuvette extends from large opening at one end and tapers inwardly to a smaller opening at the opposite end. The cuvette is arranged adjacent the bottom of the outer crucible with the large open end facing the crucible by using the coating cuvette, the multiple or plurality of fibers drawn from the double crucible can in a single operation be gathered into a light conducting cable or bundle and at the same time be provided with a protective casing made of a coating material.

Advantageously, the coating cuvette is so designed that it consists of two longitudinally extending halves which can be moved towards one another transversely to the direction of movement of the fibers therethrough. Thus, during threading of the multiple or plurality of fibers drawn from the crucible through the cuvette, the halves can be opened and then moved together to facilitate gathering the fibers into the bundle.

Preferably, the coating cuvette consists of a material which is soft when compared with the material forming the cladding of the optical fibers.

An advantageous embodiment of the device is to have the cuvette mounted on a gimbal or cardan suspension. Thus, the coating cuvette does not necessarily have to be exactly centered with regard to the double crucible as is required with cuvettes which are rigidly arranged or supported.

In order to additionally facilitate the threading of the fibers through the cuvette, it is expedient to provide an aperture partition which has an adjustable opening. This partition is arranged between the double crucible and the gathering and coating device such as the cuvette.

BRIEF DESCRIPTION OF THE DRAWINGS

FIG. 2b is a top plan view of the double crucible illustrated in FIG. 2a;

FIG. 3b is a top plan view of the cuvette illustrated in FIG. 3a.

DESCRIPTION OF THE PREFERRED EMBODIMENTS

Figure 1:
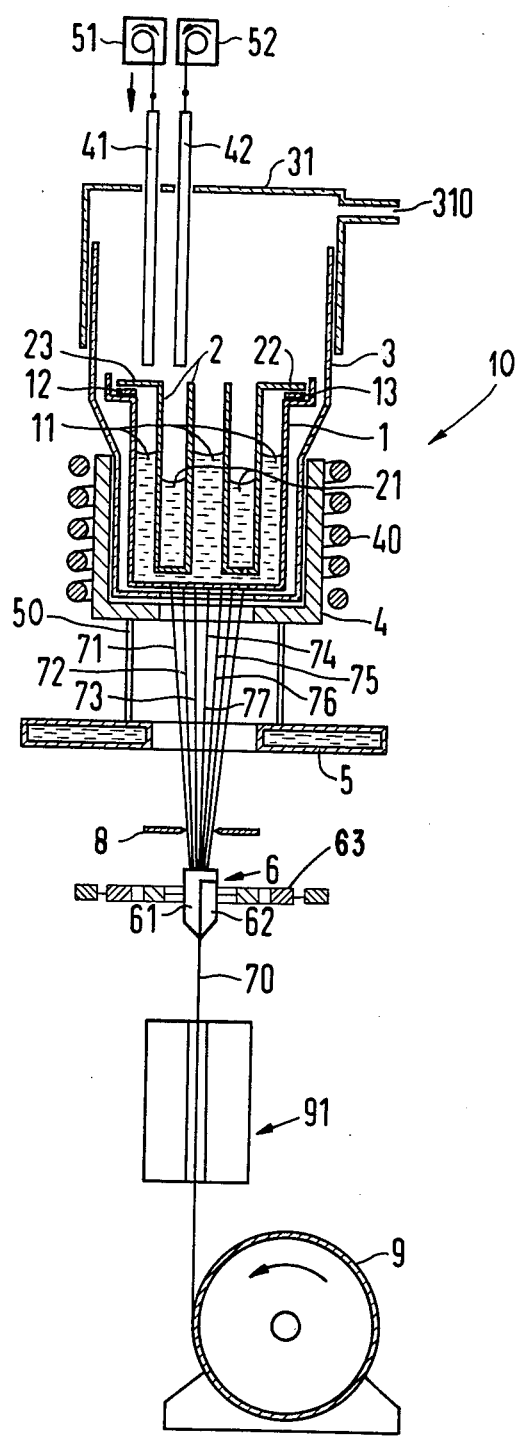
FIG. 1 is a schematic cross-sectional view of the device in accordance with the present invention.

The principles of the present invention are particularly useful when incorporated into a device generally indicated at 10 for drawing cladded light conducting fibers and gathering them into a bundle of coated, cladded fibers.

The device 10 includes a double crucible having an outer crucible 1 and an inner crucible 2. A glass melt 11, which is a melt for the cladding of the fibers being drawn, is received in the outer crucible 1 and a glass melt 21 is received in the inner crucible for forming the core of each of the cladded fibers. It can be easily seen that the inner crucible 2 is formed by an inner and outer concentric walls which provide an annular chamber for receiving the melt 21. The annular chamber of the inner crucible 2 is opened at the top so that while the inner crucible is surrounded by the glass melt 11 for the cladding and also contains glass melt 21, a rod such as 42 of the material can be lowered by a device 52 into the inner crucible 2. A similar device 51 enables lowering a rod 41 of the material into the melt 11 for the cladding in the outer crucible so that additional materials can be added to each of the crucibles during the drawing operation. Thus, due to construction of the double crucible including the outer crucible 1 and the inner crucible 2, each of which have concentrically arranged walls, the drawing in area of the glass melt for both the cladding and for the core for each nozzle pair is substantially the same.

As illustrated in FIG. 1, the inner crucible 2 has a pair of wings or ears 22 and 23 (also see FIG. 2b) which rest on glass disks 12 and 13 that are supported in the outer upper edge of the outer crucible 1. The disks 12 and 13 serve to space the bottom of the inner crucible 2 from the bottom of the outer crucible and by changing the thickness of the glass disks, the spacing or interval between these two bottoms can be adjusted.

Figure 2A:
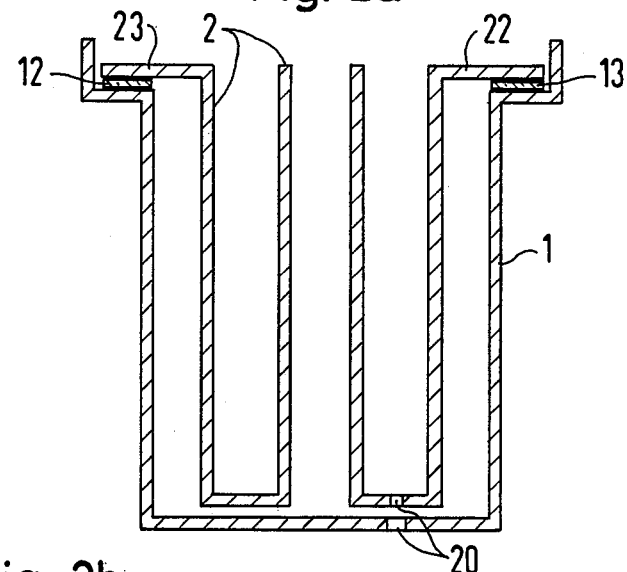
FIG. 2a is a longitudinal cross-sectional view of a double crucible taken along lines II—II of FIG. 2b.
Figure 2B:
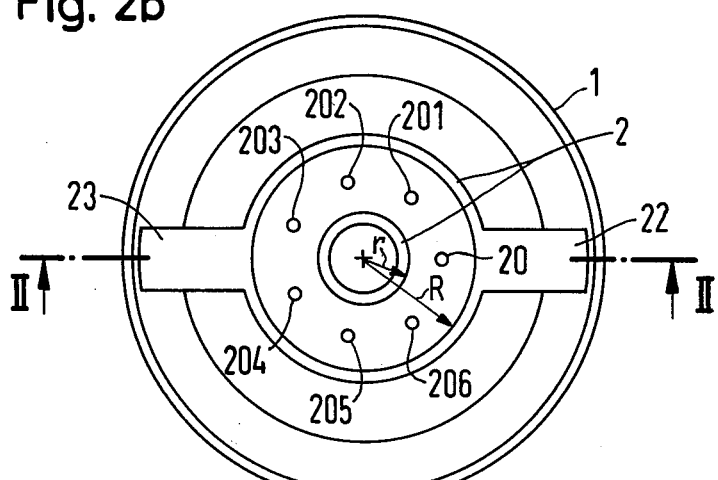

As best illustrated in FIG. 2b, the outer crucible 1 and the inner crucible 2 have a circular cross section and are concentric with the two walls of the inner crucible and the single wall of the outer crucible being concentrically arranged. The nozzles are arranged on a circle which is also concentric with the walls of the double crucible and a bore or nozzle such as 20 of the inner crucible is aligned with its axis concentric with the axis of the the corresponding bore or nozzle on the outer crucible as illustrated in FIG. 2a.

Preferably, the inner and outer crucibles are made of a platinum-rhodium alloy having 90% platinum and 10% rhodium content. Thus, the outer crucible 1 will be electrically conducting and both the inner and outer crucibles will have a high degree of stability with regard to their shape.

To ensure the concentric alignment of the nozzles, a concentric adjustment between the inner and outer crucible takes place by means of the locking and adjusting cap, which is also made of a platinum-rhodium alloy having 90% platinum and 10% rhodium. Prior to commencement of drawing, both crucibles can be locked by means of the mandrels and thus premature discharge and mixing of the glass for the cores and the casing glass is prevented.

For protection from impurities and particularly impurities originating from a thermal insulation 4 (FIG. 1) of the double crucible arrangement, the double crucible including the outer crucible 1 and the inner crucible 2 are disposed in a protective vessel 3 made of quartz glass. The protective vessel 3 on its bottom has an opening and is provided with a top which can be shut by a lid 31. This lid 31 is provided with an opening for inserting the glass rods 41 and 42 which rods are attached to suitable platinum wires as they are lowered into the crucibles by the motors of the devices 51 and 52. An additional opening 310 is provided in the lid 31 for supplying a protective gas or for evacuation of the surfaces above the melt if desired.

To heat the contents in the crucibles, a high frequency coil 40 surrounds the vessel 3 and the thermal insulation layer 4. The thermal insulation layer 4 is, for example, $Al_2O_3$ and is situated between the coil 40 and the outer crucible 1.

The entire device described hereinabove with respect to FIG. 1 is supported via a supporting tube 50 of quartz glass serving as an intermediate part above a hollow ring 5 through which a cooling water can be passed. The hollow ring 5 serves for screening the lower sections of the device from heat which is radiated from the double crucible.

A coating cuvette 6 is arranged underneath the base of the outer crucible and as illustrated is disposed beneath the hollow ring 5. The coating cuvette 6 is provided at each end with an opening and the interior of which tapers inwardly from a large opening on one end to a small opening on the other end which large opening is disposed adjacent or facing the bottom of the double crucible. The coating cuvette gathers the fibers into a bundle or cable and coating of the gathered fibers takes place in a simple manner by virtue of the fact that the hollow space in the coating cuvette 6 is also charged with a coating material which can be continually maintained. In this way, the plurality of fibers freshly drawn from the outer crucible which is schematically illustrated in FIG. 1 consists of single fibers 71–77 are immediately gathered into a light conducting cable or bundle 70 and provided with a protective casing consists of the coating material.

In order to facilitate threading of the plurality of fibers into the coating cuvette 6, the cuvette 6 preferably consists of two longitudinal extending halves 61 and 62 (FIG. 3a) which are movable towards one another transverse to the direction of movement of the fibers through the cuvette. For threading, both halves 61 and 62 can be moved apart along the support pins 611 and 621. Then a group of fibers can be gathered together and drawn through the cuvette whose halves are then subsequently closed to complete the threading operation.

In addition to the cuvette composed of two parts, an aperture partition 8, which has an adjustable opening or aperture is arranged between the bottom of the double crucible and the coating cuvette 6 and serves to facilitate the threading operation. As illustrated, the aperture partition 8 is arranged between the cuvette 6 and the support ring 5.

In order to protect the surface of the glass fibers in the narrow cross section of the coating cuvette, the curvette is formed of a soft material, for example, plexiglass, when compared with the materials forming the cladding of the optical fibers. The coating cuvette is preferably supported by a gimbal or cardan suspension 63. The gimbal or cardan suspension allows the cuvette to move so that it is not necessary to accurately center the coating cuvette relative to the nozzles of the double crucible. When the cuvette is rigidly arranged beneath the double crucible, a decentering or misalignment can lead to a non-uniform stress application and a non-uniform coating of the fiber bundle. However, with the cardan or gimbal suspension problems with non-uniform stresses and coating are considerably reduced or even eliminated.

After the cuvette, a drying furnace 91 is positioned for drying the coated material of the bundle or cable 70 of light conducting fibers. After passing through the dryer 91, the dried and consequently finished light conducting cable or fiber bundle 70 is wound onto a conventional fiber drawing drum 9.

As mentioned hereinabove, FIGS. 2a and 2b show enlarged views of the double crucible. As illustrated in FIG. 2b, the double crucible has seven equally spaced nozzle pairs 20 and 201–206 which are situated in the annular ring-shaped bottom or base of the inner crucible 2 on a circle which is concentric with the annular inner and outer walls of the crucible. In addition, the circle on which the nozzles 20 and 201–206 lie has a radius which is equal to the arithmetic means between the outer radius R and the inner radius r of the inner crucible. The edge of the nozzles in the outer crucible which have a large diameter cannot be seen in FIG. 2b. Preferably, the preferred dimension for the double crucibles are the outer crucible 2 having an outer diameter of 4–8 cm, an external diameter of the inner crucible being between 5–6 cm, an inner diameter of the inner crucible between 1.5 and 0.5 cm. The height of the double crucible between 6–10 cm. The standard measurements for the nozzles of the inner crucible are 1.5–2.5 mm and for the nozzles of the outer crucible are 2.5–3.5 mm.

Figure 2C:
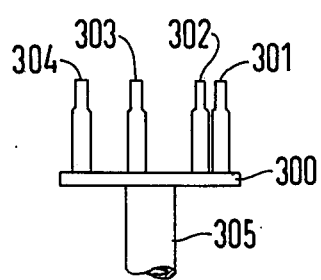
FIG. 2c is a side view of the closing pin arrangement for the crucible of FIG. 2b.

As mentioned hereinabove, FIG. 2c shows a suitable locking cap for the double crucibles. As illustrated, the locking cap consists of a circular plate 300 upon which a separate mandrel for each nozzle pair is mounted. The side elevation of FIG. 2c only shows the pins or mandrels 301–304 for the nozzles 20, 206, 205 and 204. The remaining pins necessary for the nozzles 201, 202 and 203 would be directly behind pins 302, 303 and 304. The pins and the plate 300 are formed of platinum-rhodium alloy having 90% platinum and 10% rhodium content. The plate 300 is mounted by means of an $Na_2OSiO_2$-$Al_2O_3$ glass on a holding rod 305 made of quartz glass. As illustrated, each of the pins such as 301–304 has a shoulder and a narrow portion. The narrow portion closes the smaller nozzle of the inner crucible 2 and extends from the shoulder which forms the closure for the larger nozzle in the outer crucible 1.

Figure 3A:
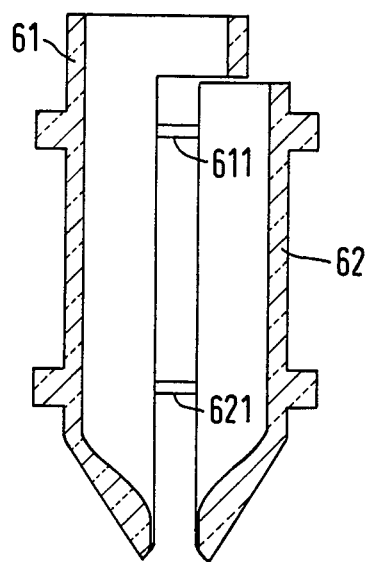
FIG. 3a is a longitudinal cross-sectional view of a cuvette taken along lines III—III of FIG. 3b.
Figure 3B:
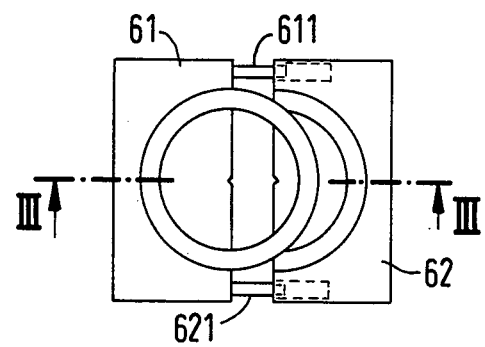

As best illustrated in FIG. 3, in a closed state, the coating cuvette 6 has the two halves 61 and 62 form a hollow cylinder terminating adjacent the lower end in a hollow frustum having a small diameter opening. The hollow frustum has the smallest possible opening the diameter of which corresponds to one of the diameter of light conducting cables such as 70 which is being drawn therefrom. The two cuvette halves are slidable on guide pins 611 and 621.

To draw a plurality of fibers, the operation proceeds in the following manner. After thoroughly cleaning the double crucible containing the inner and outer crucibles 1 and 2, the double crucible is placed in the quartz glass protective vessel 3 within the thermal insulation 4. For the purpose of removing any absorbed humidity, the crucible is heated to about 1100° C. in an argon protective atmosphere for approximately 30 minutes. Subsequently, the double crucibles are charged while maintained at this temperature. During this time, glass rods, which are attached to platinum wires, for example, an LF 5 glass rod of 10 mm diameter and 30 cm length, is lowered into the outer crucible 1 to form the melt of the material for the cladding. In a similar manner, a rod of F 7 glass having the same measurements is lowered by the mechanism 52 into the inner crucible 2 to form the melt for the fiber cores. These two rods are inserted into the inner and outer crucibles at a feed rate of about 4 mm per minute. During this procedure, the glass rod touches the hot crucible wall and melts slowly whereby bubble formations can be avoided by the roughness of the rod breaking points and on the crucible walls. When selecting the level for the melt in each of the crucibles, the different densities of the melts have to be taken into consideration in order that the two melts exert the same pressure on the nozzles.

In order to draw fibers, the temperature is lowered to approximately 700° C. and to reduce the heat radiation, the crucible is covered by a quartz glass plate thereupon a platinum disk. When the two melts have reached the thermal equilibrium, the locking cap 300 is drawn downward and the single fiber for each nozzle pair is drawn. The single fibers are separated from the locking cap and placed on the winding drum 9 which has a diameter of about 2 m.

In order to produce a fiber cable such as 70, the freshly drawn single fibers 71–72 are gathered by means of the adjustable aperture partition 8 and subsequently pass through the coating cuvette 6 which is in an open position such as illustrated in FIG. 3a. After threading the single fibers through the opened cuvette, it is closed and filled with the coating material, for example, polysiloxane or an epoxide. The aperture partition 8 is completely open during the drawing process since gathering takes place through the narrowest cross section of the cuvette 6. Drying and hardening of the fiber cable can be carried out, for example, by a furnace 91 of 30 cm length operating at a temperature of 470° C.

The structure of the light conducting cable and the synthetic coating is to be selected in such a way that the mechanical strength of the fiber groups is considerably increased without impairing the attenuation property of the fibers. For this purpose, a soft polysiloxane is very suitable as a coating material since it has no affect worth mentioning on the attenuation of the single fibers. In this context, the high numerical aperture of the fibers, which are produced by the double crucible, produces an advantageous effect because on account of the synthetic coating and the cable process, optical losses frequently occur for reasons of microbending. These losses will have a smaller effect when the fibers have a high aperture instead of a small one. In order to increase the mechanical tensile strength of the fiber group following the coating with a soft synthetic material such as polysiloxane or nylon as mentioned, a second, harder synthetic coating can be applied by means of an extruder during the same operation. Also, the extruder can be used in place of the coating curvette. If, during the drawing process, new core and cladding material in the form of glass rods are continually added to the crucible, then kilometer after kilometer of fiber groups can be drawn from the double crucible. Concerning their optical properties, the single fibers of the multi-fibers each correspond to the fibers drawn in accordance with the single nozzle process.

Since, for practical application of the light conducting groups, not only the optical properties but also mechanical properties are decisive importance, this process offers a further advantage compared with former processes. Fibers, which are drawn from light conducting rods, often have a large number of imperfections, which are caused by dust and dirt particles, scratches and other surface defects of the glass rod and lead to a reduction of the tensile strength of the fibers. Moreover, during the drawing process, additional damage to the rod surface can occur by dust particles withing the heating zone so that additional imperfections can be made in the first surface. The concentration and chemical composition of these particles depend on the kind of heating source, for example, resistant furnace, laser, induction heating and the drawing atmosphere. Using the process suggested by the present invention, these surface defects are eliminated since the fibers are drawn directly from the melt and these "virgin fibers" are then enveloped with the protective synthetic coating already within a fraction of a second after having left the drawing nozzles.

A twisted cable can also be produced by turning the drawing drum and the double crucible continually against each other during the drawing operation.

Other minor modifications may be suggested by those versed in the art, it should be understood that we wish to embody within the scope of the patent warranted hereon, all such modifications as reasonably and properly come within the scope of our contribution to the art.

We claim:

1. In a device for drawing a group of cladded light conducting fibers, each fiber having a core consisting of a first glass material and a cladding of second type of glass material, said device comprising a double crucible having an inner crucible with a bottom and an outer crucible with a bottom, the inner crucible receiving a melt of the first glass material for the core and the outer crucible receiving a melt of the second glass material for the cladding, the bottom of the inner crucible as well as the bottom of the outer crucible being provided with a multitude of nozzles with the central axis of each nozzle in the inner crucible being aligned with the central axis of a corresponding nozzle of the outer crucible, and said device including means for gathering the plurality of cladded fibers and coating the gathered fibers to form a bundle of coated, cladded fibers with the improvement comprising said inner crucible having an annular ring-shaped bottom with annular inner and outer walls, said inner crucible being disposed in the outer crucible with the ring-shaped bottom being parallel to the bottom of the outer crucible, and the nozzles being arranged on the bottoms of said crucibles on a circle concentric with the walls of the inner crucible so that the same temperature prevails for the glass melt present in the double crucibles being drawn through each nozzle.

2. In a device according to claim 1, wherein the inner and outer walls of the inner crucible merge with the bottom in circular boundary lines and the circle of nozzles has a radius equal to one-half of the sum of the radii of the circular boundary lines of the inner and outer walls.

3. In a device according to claim 2, wherein at least the outer crucible is made of an electro conductive material, said double crucible being disposed within an induction coil so that the outer crucible of the double crucible and the induction coil form an induction furnace, wherein the inner crucible is disposed within the outer crucible in such a way that the boundary lines on the bottom surface of the inner crucible are concentric to a boundary line on the bottom surface of the outer crucible.

4. In a device according to claim 3, wherein each of the inner and outer crucibles have a circular cross section taken in a plane extending transverse to the axis of the nozzles, and are concentrically arranged with the inner crucible having a chamber with an annular cross section, said chamber being open towards the top to enable the insertion of a member of the first glass material forming the melt in said chamber.

5. In a device according to claim 1, wherein the means for gathering and coating comprises a coating cuvette containing a coating material, said coating cuvette being provided with an opening at each end with the interior surface tapering inwardly from a large open end to an opposite small open end, said coating cuvette being disposed opposite the bottom of the outer crucible with the large open end directed thereat.

6. In a device according to claim 5, wherein the coating cuvette comprises two longitudinal halves, said longitudinal halves being moved towards one another transversely to the direction of movement of the fiber in the cuvette so that during initial threading of the device, the opened halves can be moved together to facilitate a gathering of a plurality of fibers into a close arrangement.

7. In a device according to claim 5, wherein the coating cuvette is mounted on a cardan suspension.

8. In a device according to claim 5, wherein the coating cuvette is formed of a soft material as compared with the second glass material forming the cladding of the optical fibers.

9. In a device according to claim 1, which includes an apertured partition having an adjustable aperture size being disposed between the double crucible and the means for gathering and coating.

* * * * *